(12) United States Patent
Kaplinsky

(10) Patent No.: US 7,492,391 B1
(45) Date of Patent: Feb. 17, 2009

(54) WIDE DYNAMIC RANGE NETWORK CAMERA

(75) Inventor: Michael Kaplinsky, Sierra Madre, CA (US)

(73) Assignee: Arecont Vision, LLC., Altadena, CA (US)

( * ) Notice: Subject to any disclaimer, the term of this patent is extended or adjusted under 35 U.S.C. 154(b) by 809 days.

(21) Appl. No.: 10/890,870

(22) Filed: Jul. 14, 2004

Related U.S. Application Data

(60) Provisional application No. 60/486,929, filed on Jul. 14, 2003.

(51) Int. Cl.
*H04N 5/235* (2006.01)
(52) U.S. Cl. .................................. 348/218.1; 348/211.3
(58) Field of Classification Search . 348/211.99–211.3, 348/216.1, 218.1, 239, 296, 297, 308
See application file for complete search history.

(56) References Cited

U.S. PATENT DOCUMENTS

| | | | | |
|---|---|---|---|---|
| 5,452,004 | A * | 9/1995 | Roberts | 348/301 |
| 6,204,881 | B1 * | 3/2001 | Ikeda et al. | 348/362 |
| 6,987,536 | B2 * | 1/2006 | Olding et al. | 348/297 |
| 7,106,374 | B1 * | 9/2006 | Bandera et al. | 348/308 |
| 7,176,965 | B1 * | 2/2007 | Noguchi | 348/222.1 |
| 2002/0176010 | A1 * | 11/2002 | Wallach et al. | 348/229.1 |
| 2002/0191082 | A1 * | 12/2002 | Fujino et al. | 348/211.14 |
| 2003/0103158 | A1 * | 6/2003 | Barkan et al. | 348/362 |
| 2004/0179118 | A1 * | 9/2004 | Itani | 348/255 |
| 2005/0012836 | A1 * | 1/2005 | Guidash | 348/302 |

* cited by examiner

*Primary Examiner*—Timothy J Henn
(74) *Attorney, Agent, or Firm*—Christie, Parker & Hale, LLP

(57) ABSTRACT

A network camera comprising an image sensor, an image processing unit, a buffer memory and a network interface. The image processing unit is configured to divide the entire image readout by the image sensor into a plurality of overexposed regions and a plurality of non-overexposed regions, select a subset of the overexposed regions containing most oversaturated pixels, control said image sensor to readout only said selected subset of the overexposed regions with adjusted optical integration time, apply multiplicative scaling to readout pixels of said selected subset of the overexposed regions to generate scaled pixels, and replace pixels in the entire image corresponding to said selected subset of the overexposed regions with respective said scaled pixels to increase dynamic range of the entire image.

16 Claims, 6 Drawing Sheets

Generation of Wide Dynamic Range Composite Image

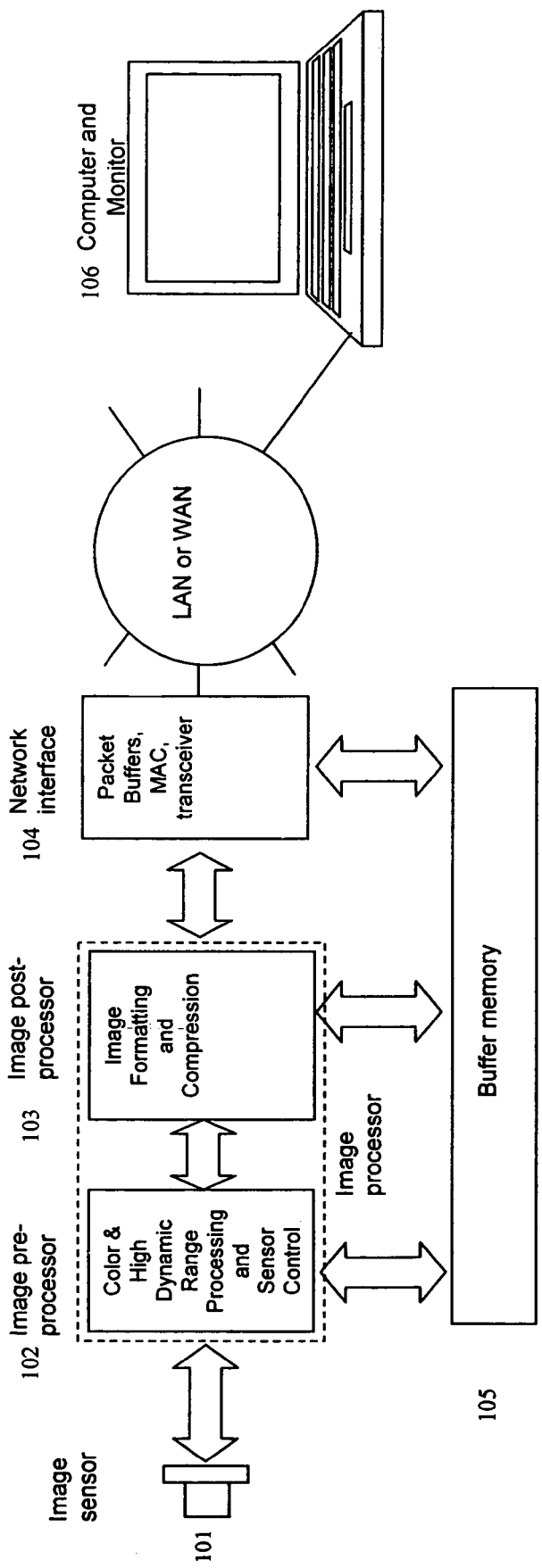
Figure 1. Wide dynamic range network camera system

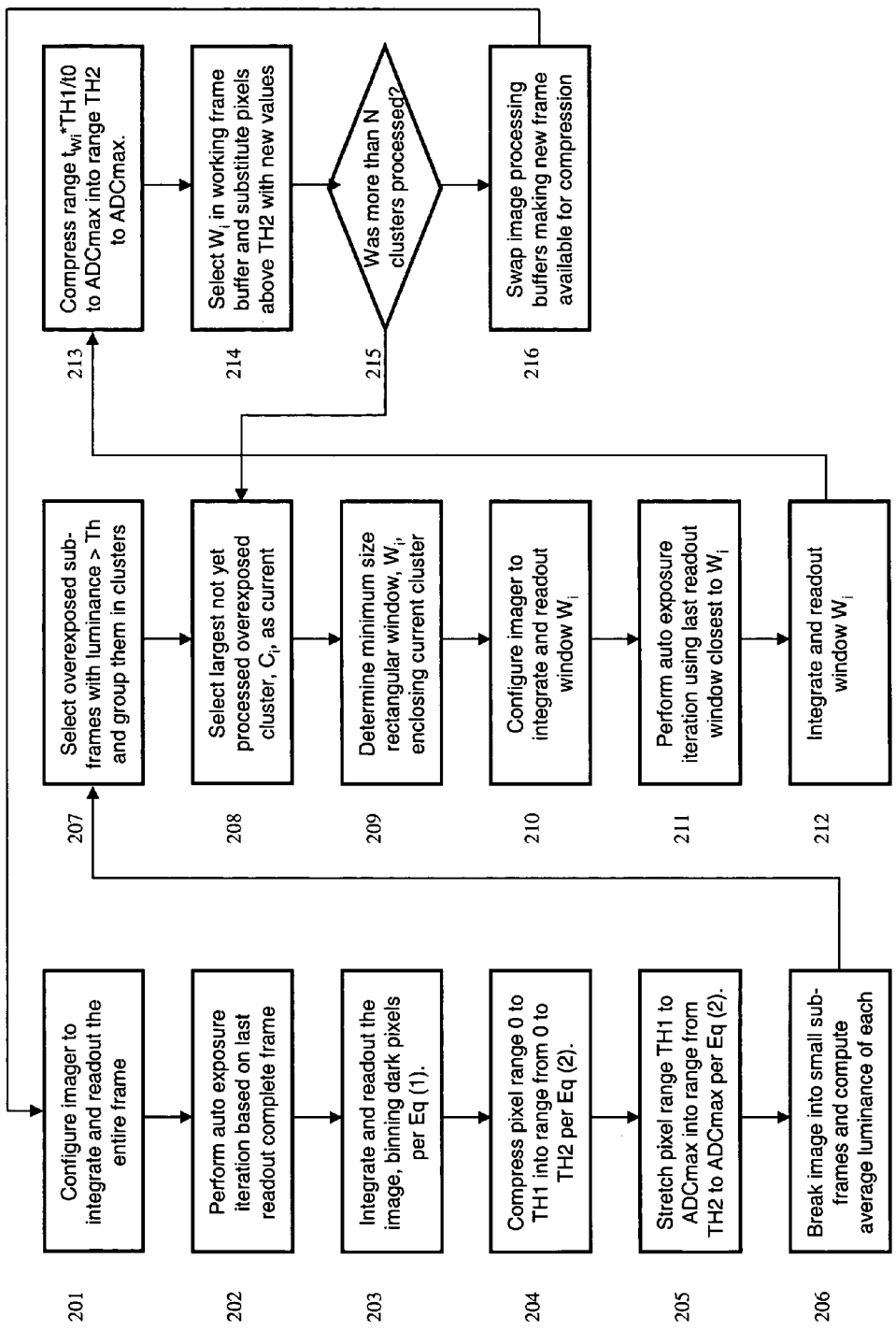
Figure 2. Wide dynamic range processing steps

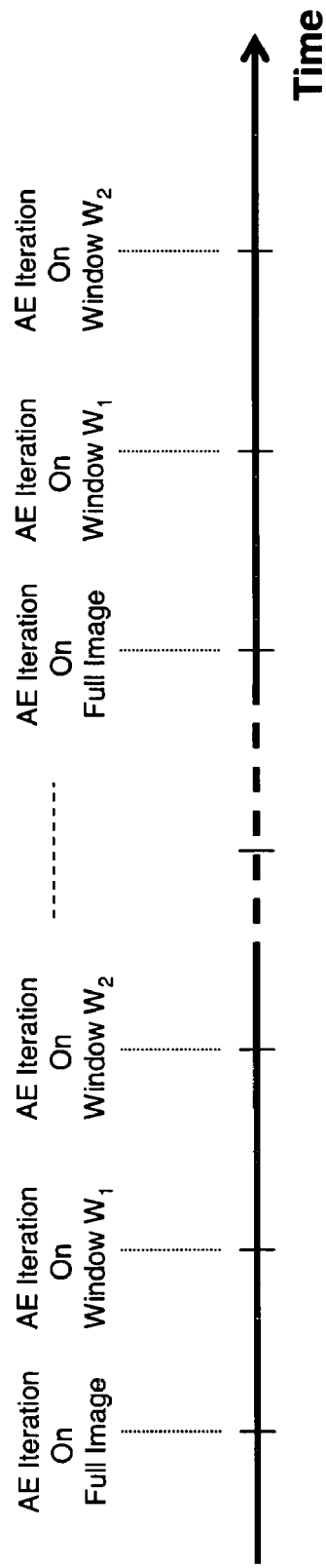
Figure 3. Multi-Window Auto Exposure Sequence for Overexposed Areas

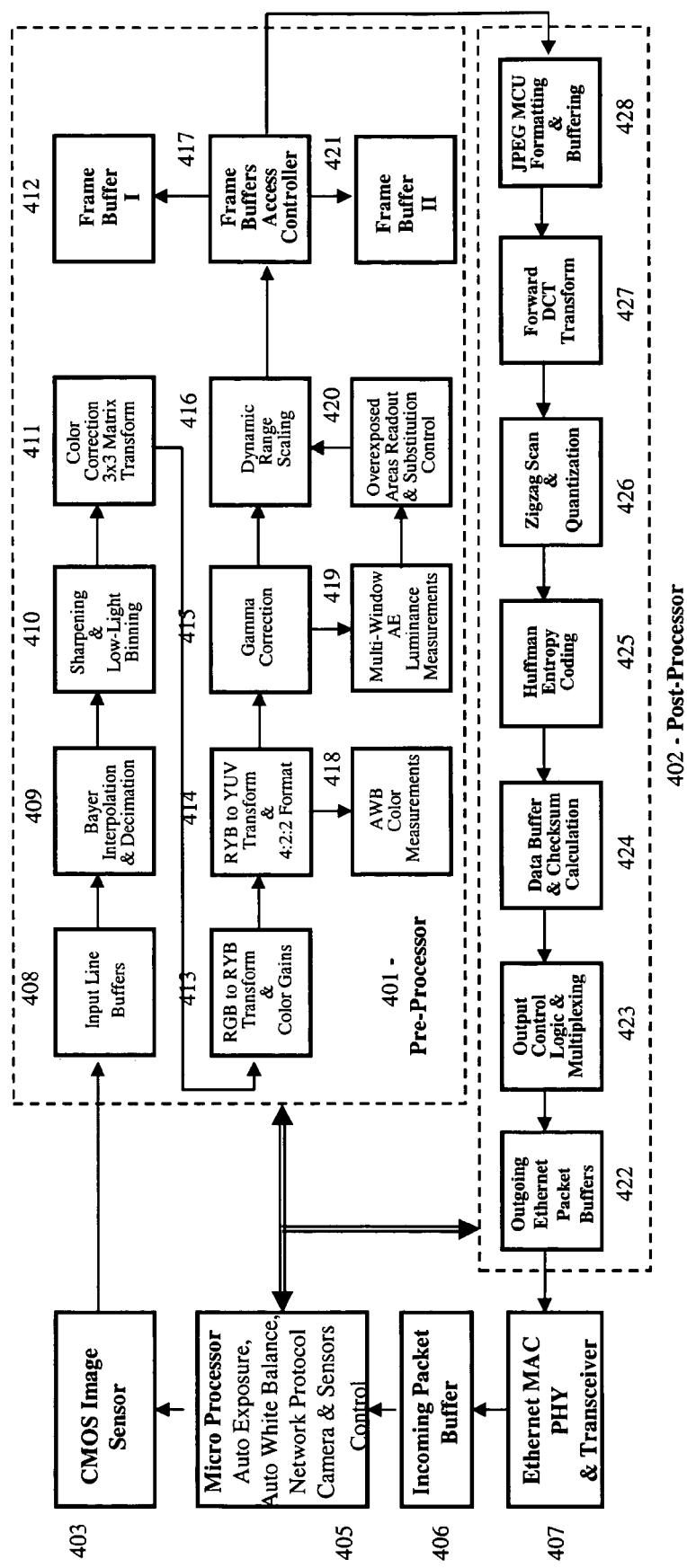
Figure 4. Block Diagram of High Dynamic Range Network Camera

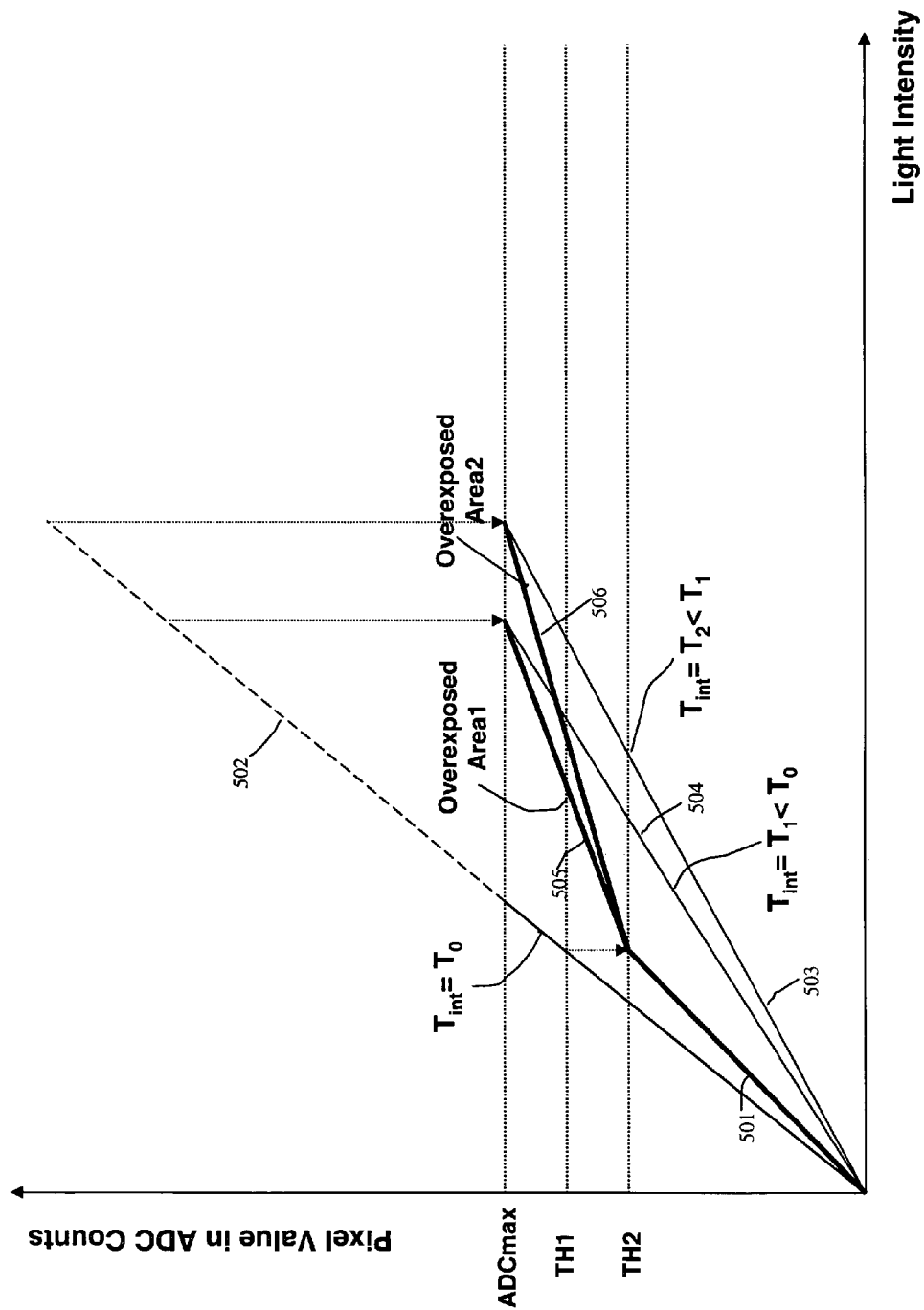
Figure 5. Data scaling for high dynamic range composite image

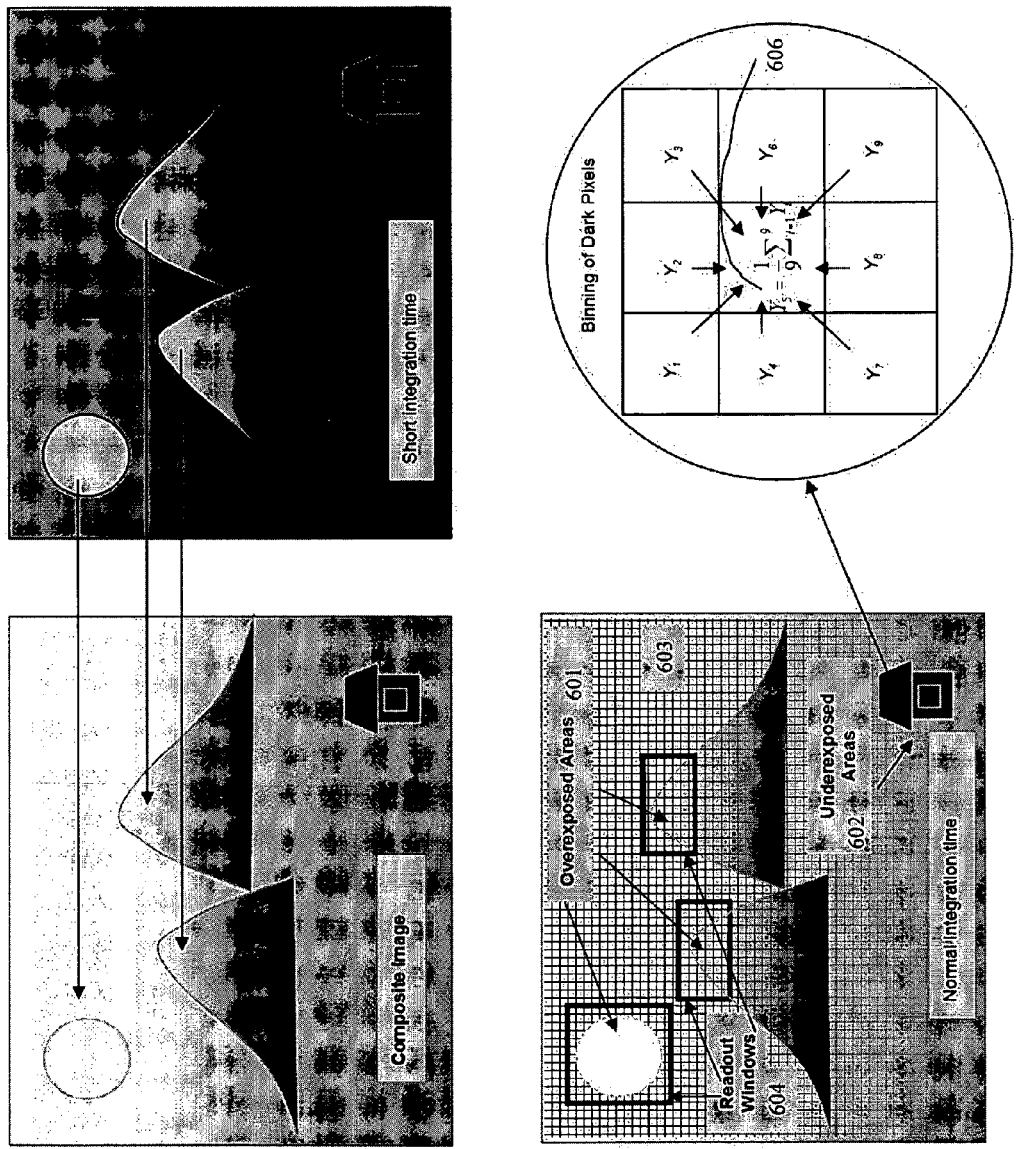
Figure 6. Generation of Wide Dynamic Range Composite Image

WIDE DYNAMIC RANGE NETWORK CAMERA

REFERENCE TO RELATED APPLICATIONS

This application claims the benefit of U.S. Provisional Application No. 60/486,929, filed Jul. 14, 2003, the contents of which are incorporated by reference herein.

Also incorporated by reference herein are the following applications filed on even date herewith:

| Title | Priority Application |
|---|---|
| DUAL SPECTRAL BAND NETWORK CAMERA | 60/486,927 |
| MULTI-SENSOR PANORAMIC NETWORK CAMERA | 60/486,928 |
| DISTRIBUTED VIDEO SURVEILLANCE SYSTEM WITH SECURE REMOTE STORAGE OF ALARMED IMAGES AND REMOTELY ACCESSIBLE IMAGE ARCHIVES | 60/486,926 |
| HIGH-RESOLUTION NETWORK CAMERA WITH AUTOMATIC BANDWIDTH CONTROL | 60/486,930 |
| VIDEO SURVEILLANCE SYSTEM WITH TARGET PATH RECONSTRUCTION | 60/486,931 |

BACKGROUND

In many surveillance applications it is highly desirable to obtain images with high intra-frame dynamic range. While there exists a wide variety of on-sensor enhancement techniques, they are mostly limited to extension of dynamic range in highly illuminated areas of the scene through suppression of the rate of charge integration in the pixel.

SUMMARY

The high-resolution network cameras with on-board frame buffers and image processing units of the present invention offer an opportunity to utilize multi-frame processing for dynamic range enhancement as the bandwidth of the video stream acquired from the imager is usually much higher than the bandwidth accommodated by on-camera network interface. For imagers with random access to pixels, such as CMOS imagers, only specific image areas, such as windows containing large number of oversaturated pixels, may be read out from additional frames characterized by different optical integration times. Identifying image windows containing large proportion of oversaturated pixels and performing individual auto exposure iterations and readout of those windows allows to create wide dynamic range composite image while avoiding delays and resulting frame rate degradation associated with multiple readouts of complete frames. Furthermore, for dark areas of the image signal-to-noise ratio can also be improved based on localized averaging (binning) of dark pixels.

In some embodiments, the present invention is a network camera comprising an image sensor, an image processing unit, a buffer memory and a network interface, where said image processing unit is capable of controlling the optical integration time of the camera, acquiring and processing full and partial frames (referred to as windows or sub-frames) corresponding to various optical integration times and combining one or more frames and sub-frames obtained with different optical integration times into a single composite image frame characterized, in general, by higher intra-frame dynamic range than that of individual images used to obtain the composite image.

BRIEF DESCRIPTION OF FIGURES

FIG. 1 depicts wide dynamic range network camera system;

FIG. 2 depicts wide dynamic range processing steps;

FIG. 3 depicts multi-window auto exposure sequence for overexposed image areas;

FIG. 4 depicts block diagram of wide dynamic range network camera;

FIG. 5 depicts data scaling for wide dynamic range composite image;

FIG. 6 depicts generation of wide dynamic range composite image.

DETAILED DESCRIPTION

FIG. 1 depicts main components comprising disclosed in the present invention wide dynamic range network camera system. In its preferred embodiment wide dynamic range network camera system comprises: camera comprising image sensor (101), image processing unit, comprising image pre-processor (102) and image post-processor (103), buffer image memory (105), network interface (104) and computer system with monitor used for acquisition and display of the camera images (106).

FIG. 6 illustrates the creation of the composite high intra-frame dynamic range image from elements of the images obtained with different optical integration times. In the preferred embodiment of the present invention the integration time of the "base" frame is controlled by the auto-exposure algorithm operating on the entire image. Once the entire image is properly exposed, the largest overexposed image areas are identified. The rectangular sub-frames (windows) enclosing the overexposed areas are than defined and auto exposure settings are computed for each oversaturated window individually. The image sensor is then configured to perform optical integration and readout of each of these windows sequentially. The pixels that are saturated in the base frame are substituted with appropriately scaled pixels from the separately readout frame or windows with much shorter optical integration times. The improvement of the signal-to-noise ratio in the dark image areas is achieved based on pixel averaging/binning in those areas.

In the preferred embodiment, the process of obtaining composite high dynamic range frame consists of the steps illustrated in FIG. 2. First, the image sensor is configured to perform optical integration and readout of entire image (201). Then the iteration of the auto exposure is performed using luminance statistics from the last acquired complete image (202). There are many methods for performing auto exposure on the video cameras and one suitable method has been previously disclosed by the author of the present invention. Regardless of implementation, the auto exposure algorithm referred to in the present invention should iteratively adjust imager exposure time and/or gain settings to maintain predefined average luminance within a specified window of the image.

Once the optical integration is completed, the complete "base" frame is readout into input buffer of the image processor. To improve the signal-to-noise ration in the dark areas of the image, those areas are processed with 2-dimensional low-pass filter, where the example of said filter is shown in FIG. 6. This transformation has the effect of signal-to-noise improvement and resolution reduction in underexposed segments of the image. In one of the embodiments of the present invention, the incoming pixel values are compared with low-signal threshold, T0, and for pixels $Y_{low}$<T0, pixel averaging (binning) is performed as (203):

$$Y_{low} = \frac{1}{9}\sum_{i=1}^{9} Y_i \quad \text{Eq (1)}$$

In the preferred embodiment of the present invention, for very dark pixels signal-to-noise ratio is further improved by discarding or attenuating chrominance components, thus eliminating noise components associated with color channels. In yet another embodiment of the present invention the signal-to-noise ratio is further improved by abandoning color processing in dark image areas in favor of monochrome processing where said monochrome processing involves averaging of the neighboring pixel signals without regard for the colors of pixels being averaged.

In the preferred embodiment of the present invention, the luminance value of pixels in the entire frame are first compared with brightness threshold TH1 (with practical values of TH1 being in the range of 0.7ADCmax to 0.9*ADCmax, where ADCmax is the maximum bit value of the imager ADC output). To allow sufficient range for processing of overexposed pixels, the pixel range from 0 to TH1 is compressed into the pixel range of 0 to TH2 across entire frame as (204 and 501):

$$Y_{base}^{new} = Y_{base} \cdot \frac{TH2}{TH1}, \text{ for base frame pixels with } Y_{base} < TH1 \quad \text{Eq (2)}$$

In the preferred embodiment of the present invention only largest overexposed areas of the image are processed, while small overexposed image areas are left overexposed. To preserve luminance continuity for unprocessed overexposed pixels, all pixels of the base frame that fall in the luminance range from TH1 to ADCmax are scaled to be in the range from TH2 to ADCmax (205) as:

$$Y_{base}^{new} = (Y_{base} - TH1) \cdot \frac{ADCmax - TH2}{ADCmax - TH1} + TH2, \text{ for } Y_{base} > TH1 \quad \text{Eq (3)}$$

To select the overexposed image area for dynamic range processing, the entire base frame is subdivided into small (e.g. 16×16) sub-frames and average luminance values, $Y_i$, are computed for each of the sub-frames (206). Sub-frames with average luminance values in excess of a brightness threshold Th are then marked as saturated (e.g. Th=0.9*ADCmax).

Once the overexposed sub-frames are identified, these sub-frames are grouped into clusters, where said clusters are defined as 2 or more overexposed sub-frames positioned so that all their centers can be connected together by a continuous curve passing only within the sub-frames of the cluster (207).

In the preferred embodiment of the present invention, the next step of dynamic range enhancement method is the identification of a small number (e.g. 2 to 4) of the largest overexposed clusters, containing most oversaturated sub-frames. The largest clusters are then processed independently. For each not yet considered large overexposed cluster the minimum size rectangular window, $W_i$, enclosing the entire cluster is determined (209) and the imager is configured to perform optical integration and readout of window $W_i$ (210). The auto exposure iteration is then performed using the luminance statistics from last readout window closest to $W_i$, wherein said closest window was readout during the generation of previous composite frame (211). The optical integration and readout times for $W_i$ will be generally much shorter than for the whole frame, allowing for rapid independent multi-window processing.

In another embodiment of the present invention in addition to the base frame an entire additional image frame is exposed and readout at much shorter integration times then the base frame. All overexposed image pixels present in the base frame are then substituted in the composite frame buffer from said additional frame with shorter optical integration time. The range compression operations on oversaturated pixels are performed following the method of the preferred embodiment described above. In one embodiment of the present invention the actual exposure time used for optical integration of said additional frame is obtained from auto exposure iteration performed using luminance statistics that includes only those pixels that are oversaturated (i.e. have luminance above TH1) in the base frame. In yet another embodiment of the present invention the value of the exposure time used for the additional frame is set as the percentage (e.g. 20%) of the exposure time used with the base frame.

Once the overexposed window $W_i$, has been readout and color-processed, the range of pixel values from $t_{wi}/t_0$*TH1 to ADCmax, i.e. pixels that were oversaturated in the base frame, is then compressed to the range from TH2 to ADCmax (213). Thus scaled pixels are then substituted for the corresponding oversaturated pixels in the base frame (214). The light response curves and described above range compression is shown in FIG. 5, where (501) is the imager response at base integration time to, (503) and (504) are the responses at integration times $t_1$ and $t_2$, and (505) and (506) are corresponding range-compressed curves for two oversaturated windows $W_1$ and $W_2$.

Once the range compression and substitution of the pixels for a current window has been completed, steps (208) through (214) are repeated until all selected large oversaturated image areas have been processed and composite wide dynamic range image has been generated in the working memory buffer. The resulting sequence of auto exposure iterations is illustrated in FIG. 3.

Working memory buffer is then swapped with processed-frame memory buffer and processed composite frame is made available for further image processing operations (e.g. image compression) (216).

In the preferred embodiment of the present invention, the wide dynamic range network camera comprises image sensor (403) that is the high resolution CMOS image sensor capable of optical integration and readout of the selected sub-frames, image buffer memory (412 and 421), network interface (422 and 407) and ASIC or Field Programmable Gate Arrays (FPGAs) operating under control of low cost microprocessor (406), where said ASIC or FPGAs implement image pre (401) and post (402) processors in the form of massively parallel image processing pipeline executing time-critical operations on image pixels, where the flow of image pixels is operated on by the sequential stages of the pipeline with each pipeline stage operating in parallel with all or most of the other pipeline stages, while said microprocessor controls the operation of the image processing pipeline, performs image pipeline and network initialization operations, relatively slow operations (performed on a once-per-frame basis) associated with auto exposure, white balance, wide dynamic range processing and protocol-level network interface computations as well as maintains the register space constituting the user interface to the camera. The block diagram of the preferred embodiment of the present invention is shown in FIG. 4.

In the preferred embodiment of the present invention, the image pre-processor is implemented as image processing pipeline that comprises multiple line memory buffers for 2-dimensional processing (408), block for image decimation interpolation of one-color-per-pixel Bayer pixel array into 3 color-per-pixel stream (409), block implementing image sharpening and low-light signal-to-noise improvement by applying high-pass and low-pass filters to the image (410), color correction block implementing the multiplication of the RGB pixel components by 3×3 color correction matrix (411), RGB to YUV transformation blocks (413 and 414), gamma correction block implemented as look-up table (415), dynamic range scaling block, implementing programmable multipliers (416), block responsible for generation of over-exposed sub-frames map and substitution of pixels in the composite frame (420), as well as multi-window Auto Exposure (AE) (419 (and Auto White Balance (AWB) (418) measurement engines that collect image brightness and color statistics required for the wide dynamic range processing disclosed in the present invention and for AE and AWB algorithms, at least 2 frame buffers (412 and 421) and associated memory access controller (417) for assembly of the composite wide dynamic range image and ping-pong buffering of processed frames.

In the preferred embodiment of the present invention image post-processor (402) comprises pipelined JPEG image compression and network packet generation modules.

In the preferred embodiment of the invention, pipelined implementation of JPEG compression includes blocks that perform MCU formation and buffering (428), Forward Discrete Cosine Transform (FDCT) (427), zigzag scan, quantization (426) and entropy coding (425). In the preferred embodiment of the present invention 2-dimensional FDCT is implemented as two passes through 1-Dimensional FDCT transform, utilizing the fact that FDCT is a separable transformation.

In yet another embodiment of the present invention, more efficient image compression, such as JPEG2000 or MPEG-2 is substituted for baseline JPEG implementation.

In the preferred embodiment of the present invention a modified version of Trivial File Transfer Protocol (TFTP—as described in RFC783) is implemented as the primary mode of image transmission, where TFTP protocol headers are formed and recorded in the transmit packet buffers (422) by the microprocessor (405), data fields of the TFTP packets, i.e. image data, along with the corresponding checksums are formed by the output stages of the image processing pipeline (423).

In the preferred embodiment of the present invention, following the image compression, the image stream is stored in one of the three network packet buffers, where these buffers are arranged in such a way, that one buffer contains the packet currently being transmitted to the Media Access Control (MAC) Ethernet interface (407), one buffer contains a packet to be transmitted next and one buffer is available for storage of the compressed data coming out of the image compression module. This triple buffered arrangement guarantees that there is always a packet available for transmission, thus maximizing utilization of available network bandwidth and also facilitates re-transmission in the event of network errors.

In the preferred embodiment of the present invention, microprocessor interfaced with image processing pipeline and Ethernet MAC and PHY hardware is also used to support a number of network protocols. In the preferred embodiment, to reduce overall complexity of implementation, a minimal set of protocols consisting of UDP, TFTP, ARP, IP, and ICMP protocols are supported.

In another embodiment of the present invention TCP/IP and DHCP protocols are also supported.

What is claimed is:

1. A method for generating wide dynamic range image in video cameras having an image sensor capable of readout of externally specified partial frames, comprising the following steps:

configuring said image sensor to expose and readout a base frame;

applying a low-pass filter to dark areas of the base frame;

compressing base frame pixel range from 0 to TH1 into range 0 to TH2 and stretching pixel range from TH1 to ADCmax into range from TH2 to ADCmax, wherein TH1 is a parameter where pixels above TH1 are oversaturated and wherein ADCmax is the maximum bit value of ADC output and wherein TH2 is a parameter where TH2<TH1;

determining rectangular image areas (windows) enclosing largest oversaturated base frame areas;

storing the base frame in an image buffer memory;

configuring said image sensor to sequentially expose and readout said windows;

compressing the pixel range in each readout window from $t_w * TH1/t_0$ ADCmax into range TH2 to ADCmax, wherein said $t_w$ is an optical integration time of a current window and said $t_0$ is an optical integration time of said base frame; and replacing in said image buffer memory base frame pixels with luminance values greater than TH2 with corresponding pixels from said windows.

2. The method of claim 1, wherein said configuring of said image sensor to expose and readout complete base frame comprises setting image sensor optical integration time, wherein said optical integration time is calculated using luminance statistics from a previously acquired base frame.

3. The method of claim 1, wherein said applying of low-pass filter comprises replacing all dark pixels with weighted average of nine pixels centered at a current dark pixel, wherein dark pixels have luminance values below low luminance threshold T0, and wherein T0 is a predetermined parameter.

4. The method of claim 1, wherein said compressing and said stretching of said pixel ranges of said base frame is performed by means of the following transformation:

$$Y_{base}^{new} = Y_{base} \cdot \frac{TH2}{TH1}, \text{ for base frame pixels with } Y_{base} < TH1 \text{ and}$$

$$Y_{base}^{new} = (Y_{base} - TH1) \cdot \frac{ADC\max - TH2}{ADC\max - TH1} + TH2, \text{ for } Y_{base} > TH1,$$

where $Y_{base}$ is a pixel value in said base frame.

5. The method of claim 1, wherein said determining rectangular image areas (windows) enclosing largest oversaturated base frame areas comprises:

dividing the entire image into small rectangular sub-frames, wherein sub-frames comprise one or more image pixels;

identifying sub-frames with high luminance values, wherein sub-frame luminance is high when the average of the luminance values of pixels comprising said sub-frame exceeds TH, wherein TH is a predetermined parameter;

grouping said sub-frames into clusters, wherein said clusters are defined as two or more sub-frames with high luminance values are positioned so that all their centers can be connected together by a continuous curve passing only within the sub-frames of the cluster; and selecting each of said clusters and determining a minimum size rectangular window enclosing all pixels of the cluster.

6. The method of claim 1, wherein said configuring of said image sensor to sequentially expose and readout said windows comprises setting an image sensor optical integration time for exposure of each window, wherein said image sensor optical integration time is calculated using luminance statistics from a window nearest to the current window, wherein said nearest window was readout during the generation of previous composite frame.

7. The method of claim 5, wherein only two, three, or four windows enclosing largest oversaturated base frame areas are used for generation of said wide dynamic range image.

8. A method for generating wide dynamic range images in a video camera having an image sensor, the method comprising:

controlling said image sensor to expose and readout a base frame;

dividing the base frame into a plurality of sub-frames;

identifying sub-frames having average luminance value greater than a predetermined threshold, as over exposed sub-frames;

grouping the overexposed sub-frames into a plurality of clusters, wherein each cluster is defined as two or more overexposed sub-frames positioned so that their centers can be connected together by a continuous curve passing within the sub-frames of the each cluster;

selecting a portion of the plurality of clusters;

for each cluster in the selected portion, determining a minimum size rectangular window enclosing the entirety of the each cluster; exposing each of said windows;

applying multiplicative scaling to image pixels in each window; and replacing pixels of base frame with scaled pixels from one or more windows, wherein said base frame and said windows are exposed at different values of said optical integration time.

9. The method of claim 8, wherein said controlling of said image sensor comprises controlling image sensor optical integration time, wherein said optical integration time is calculated using luminance statistics from a previously acquired base frame.

10. The method of claim 8, wherein said replacing pixels of base frame comprises replacing all dark pixels with weighted average of nine pixels centered at a current dark pixel, wherein dark pixels have luminance values below a low luminance threshold.

11. The method of claim 8, wherein said controlling of said image sensor comprises setting an image sensor optical integration time for exposure of each window, wherein said image sensor optical integration time is calculated using luminance statistics from a window nearest to the current window, and wherein said nearest window was readout during the generation of previous composite frame.

12. A video camera comprising:

an image sensor for exposing and reading out a base frame;

a memory buffer for buffering said base frame; and an image processing unit configured to divide the base frame into a plurality of sub-frames; identify sub-frames having average luminance value greater than a predetermined threshold, as overexposed sub-frames; group the overexposed sub-frames into a plurality of clusters, wherein each cluster is defined as two or more overexposed sub-frames positioned so that their centers can be connected together by a continuous curve passing within the sub-frames of the each cluster; select a portion of the plurality of clusters, for each cluster in the selected portion, determining a minimum size rectangular window enclosing the entirety of the each cluster; exposed each of said windows; apply multiplicative scaling to image pixels in each window; and replace pixels of base frame with scaled pixels from one or more windows, wherein said base frame and said windows are exposed at different values of said optical integration time.

13. The video camera of claim 12, further comprising a network interface for transmitting image data to a computer network.

14. The video camera of claim 12, wherein said image processing unit comprises a plurality of comparators, wherein said image processing unit is configured to determine said overexposed pixels using said comparators, and wherein said overexposed pixels are pixels that exceed a given threshold value.

15. The video camera of claim 13, wherein said network interface is Ethernet network interface.

16. The video camera of claim 12, further comprising an image processor equipped to perform image compression.

* * * * *

UNITED STATES PATENT AND TRADEMARK OFFICE
CERTIFICATE OF CORRECTION

PATENT NO. : 7,492,391 B1  
APPLICATION NO. : 10/890870  
DATED : February 17, 2009  
INVENTOR(S) : Michael Kaplinsky Page 1 of 1

It is certified that error appears in the above-identified patent and that said Letters Patent is hereby corrected as shown below:

In the Claims

Column 6, line 27, Claim 1 — Delete "$t_w*TH1/t_0$ ADCmax",  
Insert -- $t_w*TH1/t_0$ to ADCmax --

Column 8, lines 27-28, Claim 12 — Delete "exposed each of said windows",  
Insert -- expose each of said windows --

Signed and Sealed this

Thirteenth Day of October, 2009

David J. Kappos  
*Director of the United States Patent and Trademark Office*